(12) United States Patent
Holzner et al.

(10) Patent No.: US 9,315,269 B2
(45) Date of Patent: Apr. 19, 2016

(54) CARGO GATE FOR HOLDING AT LEAST ONE CARGO ITEM WITHIN A CARGO HOLD OF AN AIRCRAFT, CARGO DECK WITH A CORRESPONDING CARGO GATE, AND METHOD FOR CONVERTING OR FITTING OUT A CARGO DECK FOR THE PURPOSE OF AIRDROPPING CARGO ITEMS

(75) Inventors: Richard Holzner, Stephanskirchen (DE); Thomas Huber, Schliersee (DE)

(73) Assignee: Telair International GmbH (DE)

( * ) Notice: Subject to any disclaimer, the term of this patent is extended or adjusted under 35 U.S.C. 154(b) by 371 days.

(21) Appl. No.: 13/817,655

(22) PCT Filed: Jul. 18, 2011

(86) PCT No.: PCT/EP2011/062191
§ 371 (c)(1),
(2), (4) Date: Feb. 19, 2013

(87) PCT Pub. No.: WO2012/028374
PCT Pub. Date: Mar. 8, 2012

(65) Prior Publication Data
US 2013/0145593 A1    Jun. 13, 2013

(30) Foreign Application Priority Data

Aug. 31, 2010  (DE) .......................... 10 2010 037 250
Nov. 10, 2010  (DE) .......................... 10 2010 060 467

(51) Int. Cl.
*B60P 7/08*   (2006.01)
*B64D 9/00*   (2006.01)
(Continued)

(52) U.S. Cl.
CPC ............... *B64D 9/003* (2013.01); *B60P 7/0892* (2013.01); *B64D 1/10* (2013.01); *B64D 1/12* (2013.01); *Y10T 29/49716* (2015.01)

(58) Field of Classification Search
CPC ............. B64D 9/003; B64D 1/10; B64D 1/12
USPC .................................. 410/77, 80, 94, 105, 69
See application file for complete search history.

(56) References Cited

U.S. PATENT DOCUMENTS

| 4,349,168 A | 9/1982 | Barnes et al. |
| 4,372,715 A | 2/1983 | Naffa |

(Continued)

FOREIGN PATENT DOCUMENTS

| EP | 0771726 A2 | 7/1997 |
| FR | 1360290 A | 3/1963 |

(Continued)

OTHER PUBLICATIONS

PCT International Preliminary Report on Patentability and Written Opinion in PCT/EP2011/062191 (English Translation), dated Mar. 5, 2013.

(Continued)

*Primary Examiner* — Stephen Gordon
(74) *Attorney, Agent, or Firm* — Barnes & Thornburg LLP

(57) ABSTRACT

A cargo gate for holding at least one cargo item at a predetermined position within a cargo hold of an aircraft comprising at least one retaining element at least one fastening device having at least one articulation for articulatedly fastening the retaining element to a cargo hold floor such that the retaining element can be pivoted from an operative position for holding the at least one cargo item into an inoperative position, wherein the retaining element can be traversed by the at least one cargo item in the inoperative position. The retaining element may be provided with a stop which can be operatively connected to a pivotable locking lug of a locking device such that the locking lug holds the retaining element in the operative position thereof.

13 Claims, 4 Drawing Sheets

Figure 1:
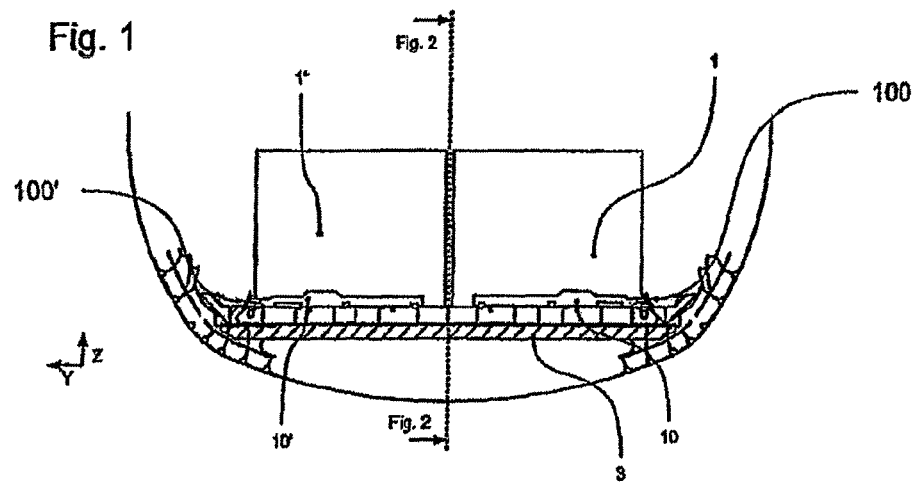

(51) Int. Cl.
*B64D 1/10* (2006.01)
*B64D 1/12* (2006.01)

(56) References Cited

U.S. PATENT DOCUMENTS

| | | | |
|---|---|---|---|
| 4,426,051 | A | 1/1984 | Banks et al. |
| 4,461,437 | A | 7/1984 | Ashley, Sr. et al. |
| 5,090,638 | A * | 2/1992 | Eilenstein-Wiegmanns et al. |
| 7,530,774 | B2 * | 5/2009 | Roberts ........................ 410/94 |

FOREIGN PATENT DOCUMENTS

| | | |
|---|---|---|
| GB | 2393704 A | 7/2004 |
| WO | 2010149180 A1 | 12/2010 |

OTHER PUBLICATIONS

International Search Report in PCT/EP2011/062191, Nov. 7, 2011.
Office Action in German Patent Application DE 10 2010 060 467.4, dated Jun. 10, 2011.

* cited by examiner

CARGO GATE FOR HOLDING AT LEAST ONE CARGO ITEM WITHIN A CARGO HOLD OF AN AIRCRAFT, CARGO DECK WITH A CORRESPONDING CARGO GATE, AND METHOD FOR CONVERTING OR FITTING OUT A CARGO DECK FOR THE PURPOSE OF AIRDROPPING CARGO ITEMS

RELATED APPLICATIONS

This patent application is a U.S. nationalization under 35 USC §371 of International Application No. PCT/EP2011/062191, filed Jul. 18, 2011, which claims priority to German Patent Application No. 10 2010 037 250.1, filed Aug. 31, 2010 and German Patent Application No. 10 2010 060 467.4, filed Nov. 10, 2010.

BACKGROUND AND SUMMARY

The invention relates to a cargo gate for holding at least one cargo item at a predetermined position within a cargo hold of an aircraft, a cargo deck with a corresponding cargo gate and a method for converting or fitting out a cargo deck for the purpose of airdropping cargo items during a flight.

For transporting air cargo, the cargo items to be transported, in particular containers or pallets, which are preferably fabricated in accordance with specific standards, are fastened inside the cargo hold by means of locking elements on the cargo hold floor.

In the military cargos sector, there is a special standard in accordance with which the containers or pallets have edge-side notches at regular intervals, in which locking lugs of locking devices engage for holding the containers in the X-direction, that is to say in the longitudinal direction of the aircraft. These locking lugs are usually configured pivotably in the plane of the cargo hold, that is the X-Y plane. However, there are also configurations in which the locking bars can be pivoted up or down. The process is particularly critical when cargo items are unloaded via parachutes during a flight. In this case, when the rear cargo hatch is opened and the cargo is supposed to be dragged out of the cargo hold by previously ejected parachutes, the locking elements must then be reliably opened as otherwise there is a risk of crashing particularly when flying low. Corresponding locking devices are disclosed in EP 0 771 726 A2 and in U.S. Pat. No. 4,372,715.

Among other things, however, cargo items which do not have appropriate notches or do not have notches of adequate shape for engagement of the locking lugs also have to be dropped.

Moreover, there are cargo items which do not conform to the specified standard or which have a standard that is designed for a different cargo loading system. One example of such cargo items are airdrop containers A-21 and A-22 whose base plates generally consist of 12 to 20 mm thick plywood. During the flight, such cargo items are fastened towards the front by means of a buffer stop. Further fixing is effected, for example, by means of loops, such as are illustrated in U.S. Pat. No. 4,426,051. Alternatively, cargo gates can be provided which are mounted between the individual cargo items in the longitudinal direction. Such cargo gates (e.g. CDS gates) have a flat retaining element which essentially extends in the Y-Z plane in order to hold the cargo items in the cargo hold. The cargo gates particularly absorb forces which act in the longitudinal direction (that is in the X-direction) of the aircraft. It is known to lower such cargo gates electrically or pneumatically during the flight for airdropping of the cargo items. The known cargo gates are normally independent systems which have a very complex construction and are folded down or actuated by means of independent servo-motors or tripping mechanisms. Therefore a great deal of time is required for the conversion of a cargo hold corresponding to a specific loading requirement. Moreover, connection of the systems is time-consuming and prone to error. Added to this, is that the known cargo gates are very heavy with the result that they contribute significantly to the overall weight of the aircraft.

Based upon this prior art, it is an object of the present invention to provide an improved cargo gate. In particular, the cargo gate according to the invention should make it easier to reconfigure and individualise a cargo deck.

In particular, the object is achieved by a cargo gate for holding at least one cargo item at a predetermined position within a cargo hold of an aircraft which comprises:
at least one retaining element;
at least one fastening device having at least one articulation for articulatedly fastening the retaining element to a cargo hold floor such that the retaining element can be pivoted from an operative position for holding the at least one cargo item into an inoperative position, wherein the retaining element can be traversed by the at least one cargo item in the inoperative position and the retaining element is provided with a stop which can be operatively connected to a pivotable locking lug of a locking device such that the locking lug holds the retaining element in the operative position thereof.

A central idea of the present invention is therefore to provide a very easily constructed, preferably purely mechanical cargo gate, which by means of existing locking devices can be held in an operative position and released. An appropriate cargo gate can be constructed very easily and robustly. Since this possibly does not include any electrical or pneumatic elements, it is unlikely that such a cargo gate will fail. Moreover, cargo decks which are fitted out for standardised cargo items can be converted without major effort such that non-standardised or differently standardised cargo items can be also be airdropped. An essential point of the present invention is that the retaining element is provided with the stop which is configured in such a way that it can be operatively connected to a locking device, in particular to a locking lug of a locking device. The locking lug of the locking device thus functions as a release mechanism while the cargo gate is a passive element.

The stop may be pivotable by means of a stop articulation from a stop position into a lowering position. The locking devices for military use already described in the introduction are frequently installed with side guides which partially encompass the cargo items such that they are secured in the Z-direction of the aircraft—that is to say upwards. The stop is preferably configured in such a way that it can engage in a guiding region formed by the side guide which also contains the locking lug. The stop is articulatedly supported to prevent it from jamming on folding down into the inoperative position. In this respect, it can be pivoted in an appropriate manner on folding down.

The stop is preferably pivoted about a stop rotational axis from its stop position into the lowering position. This stop rotational axis may run perpendicular to the rotational axis of the retaining element (pivoting of the retaining element between the operative and inoperative position thereof).

The cargo gate may comprise at least one spring assembly which loads the stop into the lowering position—that is to say the position which does not hinder folding down of the cargo gate. For secure folding down of the retaining element from the operative position thereof into the inoperative position, it is helpful if the stop is pivoted into the lowering position as soon as no force or only a slight force acts on it. An appropriate spring assembly which loads the stop into this position can be provided for this purpose.

The articulation for pivoting the retaining element from the operative position thereof into the inoperative position may comprise a pivot articulation which defines a rotational axis. For the articulated support of the retaining element, a pivot articulation is to be preferred as it enables the retaining element to be folded away in the direction of airdropping such that movable elements cannot become wedged.

The stop may protrude beyond the retaining element in the inoperative position in a direction parallel to the rotational axis. This is preferably the Y-direction of the aircraft.

The fastening device may comprise a holding device, in particular a quick-closing element, e.g. a holding slide, for fastening in a perforated rail and/or a seat rail of the cargo hold.

The fastening device is preferably reversibly mountable on the cargo deck such that it is easy to alter the position of the cargo gate. All the known mechanisms in this field may be used for fastening the cargo gate on the cargo deck. The fastening device is preferably anchored in perforated rails and/or seat rails which are provided on the cargo hold floor. According to the invention, appropriate adapters can also be provided in order to anchor the fastening device at any point within the cargo hold. The holding devices make it possible to reconfigure the cargo deck quickly. Thus the cargo deck can be individually adapted to different cargo items, with varying lengths for example. By means of the positioning within the perforated rails and/or seat rails, it is possible in each case to find a position for the cargo deck in which a corresponding locking element or corresponding locking device is available.

The retaining element may be a flat and/or grid-shaped element which extends along a retaining element plane. The cargo gate, in particular the fastening device, may be configured in such a way on a cargo deck for fastening of the retaining element that the retaining element plane extends in the operative position thereof essentially perpendicular to the X-direction of the cargo deck, in particular of the aircraft.

The cargo gate may be configured in such a way that, when it is in the mounted state on the cargo deck, it spans at least one third, in particular at least half, in particular at least two thirds, of a cargo loading path of the cargo deck.

The retaining element may have a width of at least 60 cm or at least 70 cm or at least 80 cm or at least 90 cm or 100 cm. The width of the retaining element may be defined such that it describes the extension of said retaining element along the rotational axis.

The retaining element may have a height of at least 5 cm or at least 7 cm or at least 10 cm or at least 12 cm or at least 15 cm. The height of the retaining element may be defined such that, in the operative position of the retaining element, it describes the shortest distance between the rotational axis and the highest point of the retaining element.

The object referred to above is furthermore achieved by means of a cargo deck of an aircraft which extends along an X-direction (longitudinal direction of the aircraft) and a Y-direction (transverse direction of the aircraft), wherein the cargo deck comprises:

at least one cargo gate as already described previously;

at least one locking device having a locking lug which is pivotable from an operative position of the locking lug into a loading position, wherein the cargo gate is arranged in such a way that the locking lug is operatively connected to the stop in the operative position of said locking lug in order to hold the retaining element in the operative position thereof.

Thus, in the operative position of the retaining element, the locking lug absorbs at least some of the forces acting on the cargo gate. These forces preferably act in the X-direction on the cargo gate, in particular its retaining element, and are transferred into the cargo deck via the locking lug. Similar advantages emerge, such as have already been described in connection with the cargo gate alone.

The cargo deck may comprise at least one side guide running along the X-direction for holding and guiding the cargo items, wherein the at least one locking device is arranged in such a way that its locking lug protrudes into a guiding region of the side guide. A side guide extending in the X-direction is preferably located on each side of the cargo deck. Similar side guides with or without locking device may be provided centrally, for example, in the aircraft such that two loading paths are created on the cargo deck. The articulatedly supported stop already described may protrude on one side or on both sides into the guiding region defined by the side guides and may contact the locking lugs therein. After lowering the locking lugs, the retaining element is automatically pivoted into the inoperative position due to the forces acting on it.

The cargo deck may comprise a plurality of identical or similarly configured locking devices which protrude into the guiding region of the side guides to hold cargo items, in particular to absorb forces acting in the X-direction, wherein fixing points, in particular seat rails or perforated rails are provided on the cargo deck in order to fix the at least one cargo gate at positions in which in each case at least one locking lug of the plurality of locking devices can be operatively connected to the stop of the at least one cargo gate. For example, the locking devices may be arranged at predefined, in particular regular, intervals. The fixing points make it possible to fix at least one cargo gate at various positions such that its stop can be operatively connected to a locking lug of a locking device.

The locking device may comprise an adjusting mechanism for remotely controlled, in particular electrical and/or pneumatic actuation. The functional elements (e.g. locking devices, power drive units with rollers, etc.) can preferably be remotely controlled such that it is possible to comply with a specified time schedule. A computer, preferably a Mission Control Computer, preferably takes over appropriate remote control.

The adjusting mechanism may be configured in such a way that the locking device can be brought into at least three states, namely:

a loading state, in which the locking lug is in the loading position;

a holding state, in which the locking lug is in the operative position and is fixed; and a release state, in which the locking lug is in the operative position thereof but can then be pivoted out of the operative position into the loading position if a force acting on the locking lug, which in particular is exerted by the cargo gate in the X-direction, exceeds a predetermined amount.

In this respect, it is possible to provide a cargo gate which does not, like conventional cargo gates, lower on a specific electrical signal but which, until airdropping takes place, provides a certain holding force that can only be overcome by the application of additional forces.

Such a cargo gate prevents cargo items from being airdropped too early or unintentionally.

The adjusting mechanism may comprise a spring assembly which defines the predetermined amount of the force acting in the X-direction.

The spring assembly may comprise a tensioning device which, in particular, is electromotively adjustable, for adjusting a preload of a retention clip. This preload can define the release point in the holding state of the locking device. The holding spring thus specifies the force which must be applied in order to release the cargo gate.

The adjusting mechanism is preferably configured in such a way that in addition to the loading state, the holding state and the release state, it can capture the locking device in at least a fourth state, namely an airdropping state in which the locking lug is in the loading position. In this respect, this state is essentially identical to the loading state. The retaining element preferably pivots into the inoperative position on assuming this state. The adjusting mechanism is configured in such a way that this state can preferably be initiated by means of an input device, e.g. at the touch of a button, or via control by the computer. In this respect, the cargo gate according to the invention offers all the functionalities that have also been offered by the customary, significantly heavier cargo gates.

The retaining element may comprise at least one recess to accommodate functional elements attached on the cargo deck in the inoperative position. Since, in its inoperative position, the flat retaining element covers a significant section of the cargo deck, it may be advantageous if recesses are provided which accommodate corresponding functional elements and do not prevent the use thereof. For example, a drive roller may protrude in the inoperative position through the recess into the cargo hold such that the cargo items can be transported on the cargo deck with low friction.

The object referred to at the outset is moreover achieved by means of a method for converting or fitting out a cargo deck for the purpose of airdropping cargo items during a flight, wherein the cargo deck comprises a plurality of locking devices, arranged in particular on the edge region of the cargo deck along an X-direction, for holding cargo items, wherein the method additionally comprises, in the step of fastening, a plurality of cargo gates, each of which comprises an articulation for pivoting a retaining element from an operative position thereof into an inoperative position, in such a manner on the cargo deck that one stop of each cargo gate respectively can be operatively connected to one pivotable locking lug of each locking device respectively in order to hold the relevant retaining element in the operative position thereof.

Further advantageous embodiments emerge from the claims. An embodiment of the invention will be explained subsequently in greater detail on the basis of drawings.

DESCRIPTION OF THE DRAWING FIGURES

Figure 2:
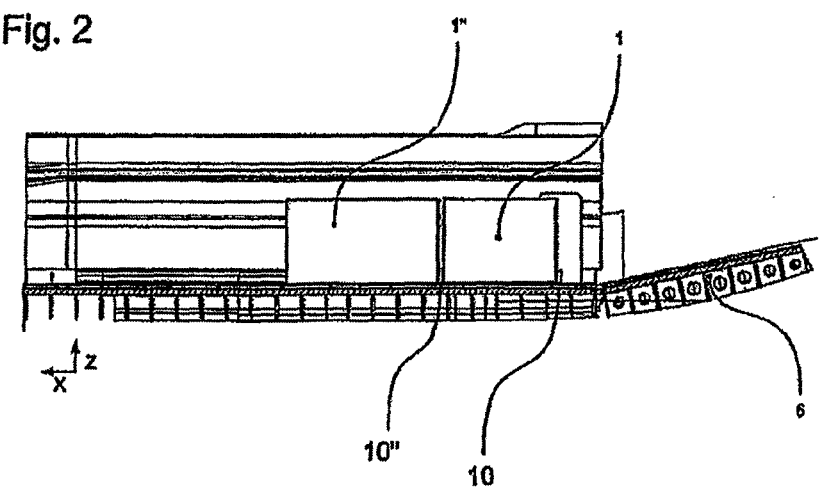
Figure 3:
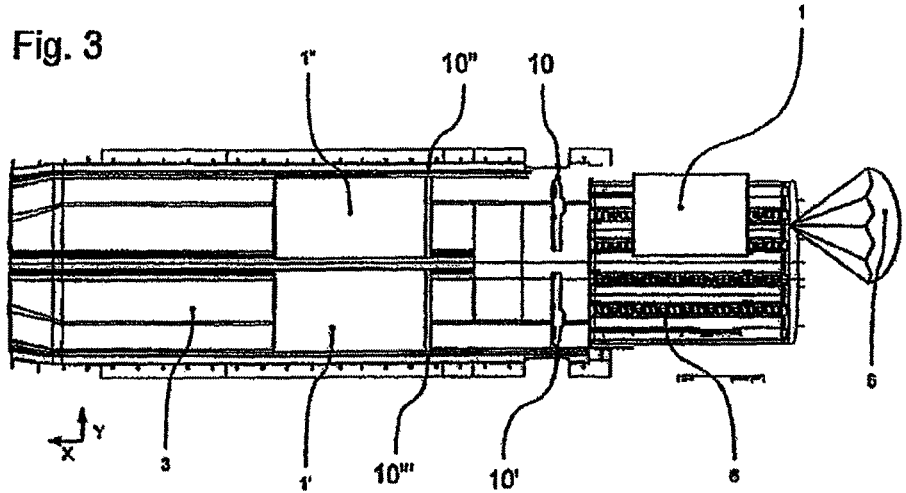
Figure 4:
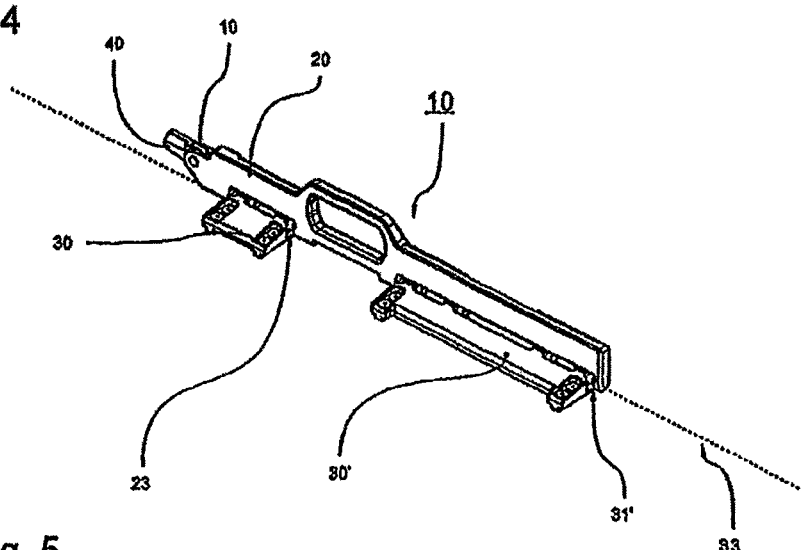
Figure 5:
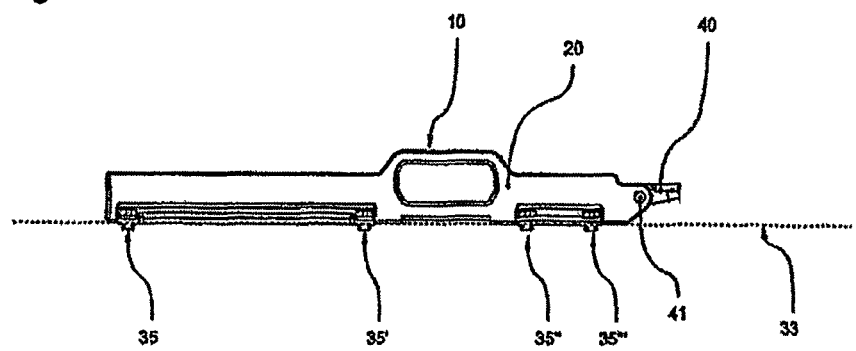
Figure 6:
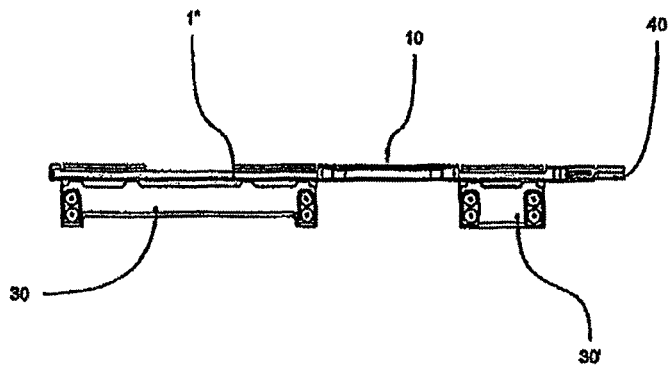
Figure 7:
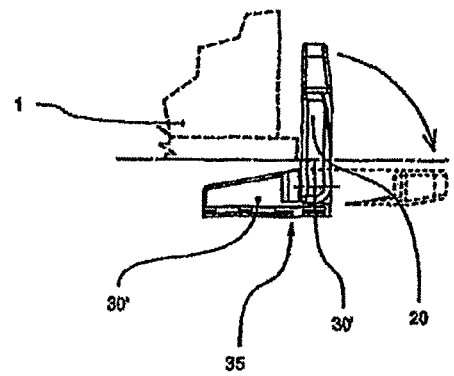
Figure 8:
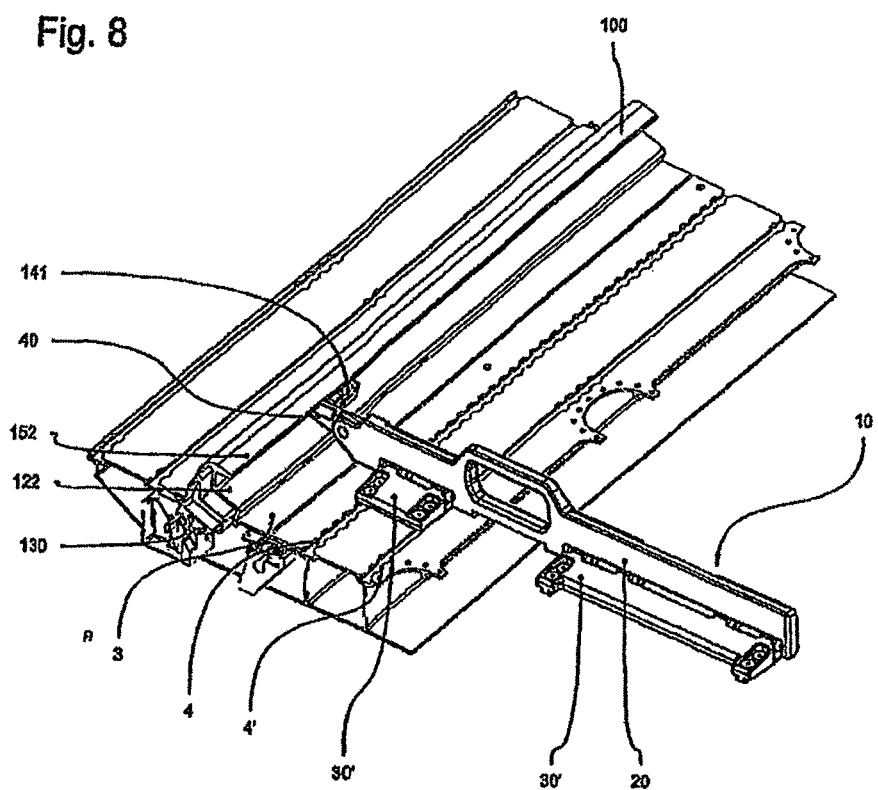
Figure 9:
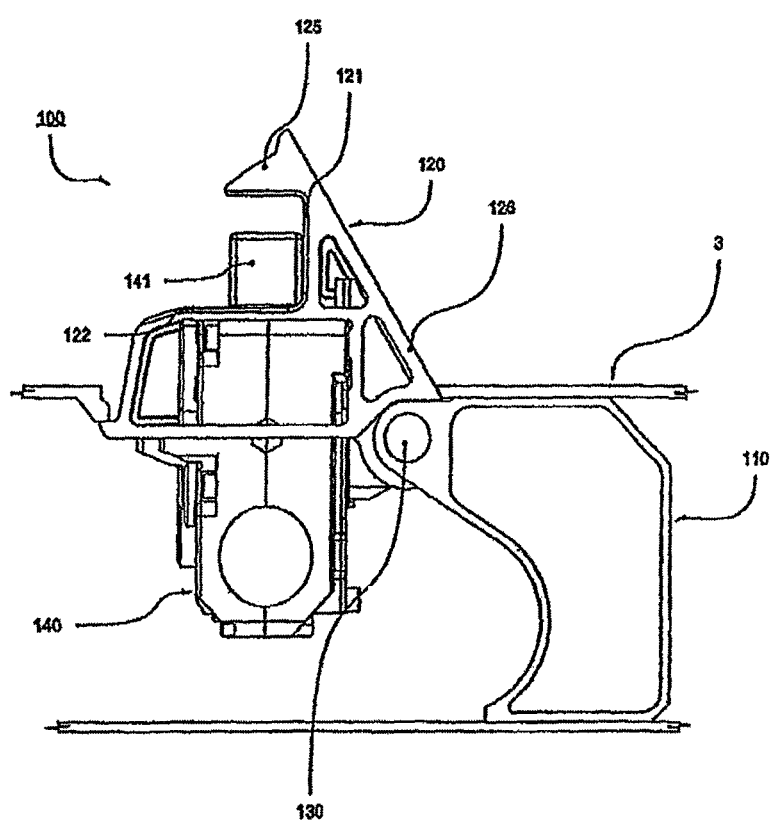

FIG. 1 a cross-section through a cargo hold of an aircraft containing cargo items secured with the cargo gates according to the invention;

FIG. 2 a longitudinal section through the cargo hold from FIG. 1;

FIG. 3 a plan view onto the cargo hold from FIG. 1;
FIG. 4 a perspective view of a cargo gate from FIG. 1;
FIG. 5 a lateral view of the cargo gate from FIG. 4;
FIG. 6 a plan view onto the cargo gate from FIG. 4;
FIG. 7 a further lateral view of the cargo gate from FIG. 4;
FIG. 8 a perspective view of a partial section of a cargo deck with the cargo gate according to the invention;
FIG. 9 a lateral view of the side guides which are used in a cargo deck from FIG. 8.

DESCRIPTION

In the following description, the same reference numerals are used for identical parts and parts acting in an identical manner.

FIG. 1 illustrates a cross-section through the body of an aircraft along the Y-Z plane. Extending within the X-Y plane therein is a cargo hold floor 3 which has various functional elements for holding, guiding and conveying cargo items 1, 1', 1". Cargo hold floor 3 from FIG. 1 has two loading paths, each of which is limited by a side guide 100, 100'. A centre guide which cannot explicitly be inferred from FIG. 1 is arranged centrally between the loading paths. A first cargo item 1 can be seen on the right-hand side of FIG. 1 and a second cargo item 1' can be seen on the left-hand side. In order to secure these cargo items against moving towards the tail, a first cargo gate 10 according to the invention and a second cargo gate 10' according to the invention, each of which is operatively connected to respective side guide 100, 100' are provided.

FIG. 2 shows a longitudinal section through the cargo hold already illustrated in FIG. 1. In the longitudinal section, only cargo items 1, 1", which are stowed in the right-hand cargo loading path, are visible. In the longitudinal section, a third cargo gate 10" according to the invention is visible, which prevents third cargo item 1" against moving towards the tail, in particular towards already partially opened tailgate 6. Third cargo gate 10" also prevents a movement of first cargo item 1 in the direction towards the nose of the aircraft.

The plan view from FIG. 3 shows a total of four cargo gates 10, 10', 10", 10''', wherein first cargo gate 10 and second cargo gate 10' are each in an inoperative position in which they can be traversed by cargo items 1, 1', 1". Third and fourth cargo gates 10", 10''' are in an operative position of the retaining element such that it secures second and third cargo item 1', 1" in such a way that they cannot move towards the tail.

FIG. 3 further illustrates the airdropping process of cargo items 1, 1', 1" during the flight. Thus a drive parachute 5 which firmly attached to first cargo item 1 is ejected. As illustrated in FIG. 3, this drive parachute drags the first cargo item over first cargo gate 10 out of the cargo hold of the aircraft. In order to release first cargo item 1, it is necessary for first cargo gate 10 to be in the inoperative position.

FIGS. 4 to 6 show a detailed view of cargo gate 10 according to the invention. This comprises a flat retaining element 20 which is rotatably connected via a first fastening articulation 31 (hinge joint) and a second fastening articulation 31' to a first fastening device 30 or a second fastening device 30'. Retaining element 20 may thus be pivoted about a rotational axis 33 relative to fastening devices 30, 30'. In an inoperative position, retaining element 20 is located essentially in the same plane as flat fastening devices 30, 30'. In the operative position of the retaining element (cf. FIG. 7), fastening devices 30, 30' and retaining element 20 essentially form a right angle. First fastening device 30 has two holding slides 35, 35' and second fastening device 30' has two holding slides 35", 35'" which essentially extend on the edge regions of fastening devices 30, 30' in the longitudinal direction (X-direction) of the aircraft.

Moreover, provided in retaining element 20 is an oval recess which, in the inoperative position of said retaining element, accommodates a cargo loading roller which makes the transport of cargo items 1, 1', 1" easier.

FIG. 7. illustrates the folding down process of retaining element 20 from the operative position thereof into the inoperative position. Thus during an airdrop, cargo item 1 can be accelerated in such a manner by means of a drive parachute 5 that said cargo item presses with considerable force against retaining element 20 in the operative position thereof. This force is sufficient to pivot retaining element 20 into the inoperative position indicated by the dashed line. Cargo gate 10 preferably further has a spring assembly which preloads retaining element 20 into the inoperative position.

According to the invention, retaining element 20 has a stop 40 articulatedly arranged on the side of said retaining element 20. This stop 40 can be pivoted by means of a stop articulation 41 from a stop position (cf. FIGS. 4 to 6) into a lowering position. The pivoting essentially takes place in the plane which defines flat retaining element 20. In an arranged state of cargo gate 10, this plane corresponds, when the operative position of the retaining element is assumed, to the Y-Z plane of the aircraft. In the stop position, elongated stop 40 extends essentially as a continuation of elongated retaining element 20. In the lowering position, the rotational axis of stop 40 stands vertically on the longitudinal axis of retaining element 20 (cf. rotational axis 33).

FIG. 8 shows cargo gate 10 in the arranged state on the cargo hold floor. For fastening of cargo gate 10, the cargo hold floor has two perforated rails 4, 4' running in the X-direction, in which holding slides 35, 35' engage such that first fastening device 30 is detachably mounted on cargo hold floor 3. Further perforated rails 4, 4' for holding slides 35'', 35''' of second fastening device 30' are not shown in FIG. 8.

In FIG. 8, retaining element 20 is located in the operative position thereof, wherein stop 40 is in the stop position and engages in a guiding region of side rail 100. This guiding region is limited by a guide protrusion 125, a horizontal guide surface 122 and a vertical guide surface 121. A locking lug 141, a locking device 140 protrude into this guiding region (cf. FIG. 9). Stop 40 and locking lug 141 are in operative connection in such a manner that forces acting in the longitudinal direction, in particular towards the tail, are transmitted by retaining element 20 into side guide 100 via locking lug 141. Specifically, stop 40 abuts locking lug 141 such that retaining element 20 cannot be pivoted into its inoperative position.

Forces acting along the longitudinal direction towards the nose are preferably absorbed by means of a stop integrated in the cargo grid.

Locking lug 141 out of side guide 100 can be pivoted mechanically from the illustrated operative position of the retaining element into a loading position. In this loading position, locking lug 141 no longer protrudes or only protrudes slightly into the guiding region of side guide 100. As soon as locking lug 141 is lowered (loading position), retaining element 20 is no longer held thereby. Retaining element 20 can be pivoted into the inoperative position, wherein stop 40 pivots upwards during the folding down process until it has taken up the lowering position. When stop 40 is in the lowering position and retaining element 20 is in the inoperative position, a longitudinal axis of stop 40 extends essentially parallel to side guide 100.

FIG. 9 shows side guide 100 with locking device 140 in detail. As already explained, horizontal guide surface 122, vertical guide surface 121 and the guide protrusion limit a guiding region and essentially form a u-profile into which edge sections of cargo items can be inserted for holding thereof. As already explained at the outset, standardised cargo items in particular have recesses which are configured corresponding to locking lug 141 and can be fixed within side guide 100. Other cargo items 1, 1', 1'' have no corresponding recesses but can be secured in a simple manner by means of cargo gate 10 according to the invention.

Locking device 140 is firmly attached to side guide 100 and protrudes away downwards. Horizontal guide surface 122 has an opening through which locking lug 141 engages in the guiding region. The necessary mechanics for actuating locking lug 141 are located within locking device 140. In particular, an electric drive motor may be provided herein which permits a plurality of states to be assumed. This may include a loading state in which the locking lug is in the loading position. Moreover, it is possible to implement a holding state in which locking lug 141 is in the operative position and is fixed. This means that regardless of the force acting on locking lug 141, said locking lug 141 remains in this position. There is preferably also a release state of locking device 140, in which locking lug 141 is located in the operative position thereof but can then be pivoted out of the operative position of the locking lug into the loading position if a force acting, preferably in the X-direction, on locking lug 141 exceeds a predetermined amount. In the release state, the holding force of locking lug 141 is still sufficient to hold retaining element 20 in the operative position thereof. Retaining element 20 can also still absorb certain forces which are applied by cargo items 1, 1', 1''. However, if these forces exceed a specified amount (e.g. drive parachute 5 has been ejected), then the force applied pivots locking lug 141 into the loading position. Corresponding mechanical components are not shown in FIG. 9. For the person skilled in the art, however, it should be clear how a corresponding locking device 140 is to be configured. Thus, during airdropping of cargo during the flight, locking lug 141 is preferably not brought into the loading position but rather into the release state such that locking lug 141 is not lowered until drive parachute 5 has been ejected.

Side guide 100 illustrated in FIG. 9 is articulatedly connected to a foot element 110 such that side guide 100 can also be lowered to form a flat section. A side guide pivot articulation 130 is provided for this.

In the exemplary embodiment previously described, retaining element 20 according to the invention has only one stop 40 which is operatively connected to locking lug 141. In a further exemplary embodiment, it would be possible to provide one stop 40 on each side of retaining element 20 such that greater forces can be transmitted into appropriately arranged locking lugs 141.

In the section of side guide 100 illustrated in FIG. 8, only one locking device 140 is integrated therein. According to the invention, a large number of locking devices can be integrated in a side guide 100.

In the exemplary embodiment described, cargo gate 10 according to the invention is arranged in a position on cargo hold floor 3 in which stop 40 cooperates with locking lug 141. It should be obvious to the person skilled in the art that cargo gate 10 according to the invention can assume other positions on cargo hold floor 3 in which stop 40—and therefore retaining element 20—are held by other locks 141 which are assigned to other locking devices 140.

In the exemplary embodiment described, stop 40 folds away upwards into a lowering position. A large number of other mechanisms are conceivable for taking stop 40 out of the guiding region of side guide 100 in an appropriate manner. For example, stop 40 can be pivoted downwards or into the interior of retaining element 20.

Described locking device 140 has a locking lug 141 which protrudes into side guide 100 from underneath. The locking lug can just as easily protrude into the side guide laterally or from any other direction.

In the airdropping procedure described previously, locking device 140 is brought into the release state while retaining element 20 is in the operative position thereof, drive parachute 5 is ejected and retaining element 20 is traversed by accelerated cargo item 1, during which said retaining element lowers into the inoperative position. Retaining element 20 according to the invention can also, however, be pivoted automatically into the inoperative position without the application of additional forces. For example, it is conceivable that a computer or a control device ejects drive parachute 5 and at the same time brings retaining element 20 into the inoperative position. To do this, locking lug 141 is lowered such that retaining element 20 is no longer held in the operative position thereof. Preferably, provided spring assemblies bring about a folding down of retaining element 20 into the inoperative position.

Moreover, it is possible to carry out an airdropping process without drive parachutes 5. Thus, retaining elements 20 can be brought into the inoperative position automatically or manually and the pitch of the aircraft can be increased such that cargo items 1, 1', 1" roll or one of them rolls out of the cargo hold. Theoretically, it would also be conceivable to configure locking device 140 in such a way that, in the release state of locking lug 141, the force acting on retaining element 20 due to increasing the pitch is sufficient to bring about an automatic pivoting of retaining element 20 into the inoperative position.

REFERENCE NUMBERS

1, 1', 1" Cargo item
3 Cargo hold floor
4, 4' Perforated rail
5 Drive parachute
6 Tailgate
10, 10', 10", 10''' Cargo gate
20 Retaining element
30, 30' Fastening device
31, 31' Fastening articulation
33 Rotational axis
35, 35', 35", 35''' Holding slide
40 Stop
41 Stop articulation
100, 100' Side guide
110 Foot element
120 Guide element
121 Vertical guide surface
122 Horizontal guide surface
125 Guide protrusion
126 Cover surface
130 Side guide pivot articulation
140 Locking device
141 Locking lug

The invention claimed is:

1. A cargo gate for holding at least one cargo item at a predetermined position within a cargo hold of an aircraft, comprising:
   at least one retaining element with a contact surface for contacting the cargo item, wherein the contact surface extends in a longitudinal direction;
   at least one fastening device having at least one articulation for articulatedly fastening the retaining element to a cargo hold floor such that the retaining element can be pivoted from an operative position for holding the at least one cargo item into an inoperative position, wherein the retaining element can be traversed by the at least one cargo item in the inoperative position,
   wherein the retaining element comprises a stop for resting against a pivotable locking lug of a locking device such that the locking lug holds the retaining element in the operative position thereof, wherein the stop is pivotally mounted at the retaining element such that the retaining element can be pivoted from a stop position of the stop into a lowering position of the stop, wherein the stop protrudes beyond the retaining element in the stop position of the stop along the longitudinal direction.

2. The cargo gate according to claim 1, wherein the stop is pivotable by means of a stop articulation from the stop position into the lowering position.

3. The cargo gate according to claim 2, including at least one spring element which preloads the stop into the lowering position.

4. The cargo gate according to claim 1 wherein the articulation for pivoting the retaining element from the operative position thereof into the inoperative position comprises a pivot articulation which defines a rotational axis.

5. The cargo gate according to claim 4 wherein the stop protrudes beyond the retaining element in the stop position in a direction parallel to the rotational axis.

6. The cargo gate according to claim 1, wherein the fastening device comprises a holding device, the holding device comprising a holding slide for fastening in a perforated rail and/or seat rail of the cargo hold.

7. A cargo deck of an aircraft which extends along an X-direction and a Y-direction, comprising:
   at least one cargo gate with at least one retaining element,
   at least one fastening device having at least one articulation for articulatedly fastening the retaining element to a cargo hold floor of the cargo deck such that the retaining element can be pivoted from an operative position for holding at least one cargo item into an inoperative position, wherein the retaining element can be traversed by the at least one cargo item in the inoperative position, the retaining element having a stop,
   at least one locking device having a locking lug which is pivotable from an operative position of the locking lug into a loading position, wherein the cargo gate is arranged in such a way that, in the operative position of the retaining element, the stop of the retaining element of the cargo gate rests against the locking lug in order to hold the retaining element in the operative position thereof, wherein the locking device comprises at least one pneumatic or electrical actuator for actuating the locking lug remotely.

8. A cargo deck of an aircraft which extends along an X-direction and a Y-direction, comprising:
   at least one cargo gate with at least one retaining element,
   at least one fastening device having at least one articulation for articulatedly fastening the retaining element to a cargo hold floor of the cargo deck such that the retaining element can be pivoted from an operative position for holding at least one cargo item into an inoperative position, wherein the retaining element can be traversed by the at least one cargo item in the inoperative position, the retaining element having a stop,
   a plurality of locking devices having a locking lug which is pivotable from an operative position of the locking lug into a loading position, wherein the cargo gate is arranged in such a way that, in the operative position of the retaining element, the stop of the retaining element of the cargo gate engages the locking lug in order to hold the retaining element in the operative position thereof,
   at least one side guide running along the X-direction of the cargo deck for holding and guiding cargo items, wherein the locking devices are arranged in such a way that the locking lugs protrude into a guiding region of the side guide;
   fixing points for fixing the at least one cargo gate in at least a first and a second position, wherein for each position at least one of the locking devices is arranged such that the locking lug of the respective locking device engages the stop of the at least one cargo gate in the operative position of the retaining element.

9. The cargo deck according to claim 7 wherein the locking device comprises an adjusting mechanism for remotely controlled electrical and/or pneumatic actuation.

10. A cargo deck of an aircraft which extends along an X-direction and a Y-direction, comprising:
  at least one cargo gate with at least one retaining element,
  at least one fastening device having at least one articulation for articulatedly fastening the retaining element to a cargo hold floor of the cargo deck such that the retaining element can be pivoted from an operative position for holding at least one cargo item into an inoperative position, wherein the retaining element can be traversed by the at least one cargo item in the inoperative position, the retaining element having a stop,
  at least one locking device having a locking lug which is pivotable from an operative position of the locking lug into a loading position, wherein the cargo gate is arranged in such a way that, in the operative position of the retaining element, the stop of the retaining element of the cargo gate rests against the locking lug in order to hold the retaining element in the operative position thereof wherein the locking device comprises an adjusting mechanism configured in such a way that the locking device can be brought into at least three states, namely:
    a loading state, in which the locking lug is in the loading position,
    a holding state, in which the locking lug is in the operative position thereof and is fixed, and
    a release state, in which the locking lug is in the operative position thereof but can then be pivoted from the operative position of the locking lug into the loading position if a force acting on the locking lug exerted by the stop of the retaining element exceeds a predetermined amount.

11. The cargo deck according to claim 10, wherein the adjusting mechanism comprises a spring assembly which defines the predetermined amount of the force (F) acting in the X-direction.

12. The cargo deck according to claim 11, wherein the spring assembly comprises a tensioning device which, in particular, is electromotively adjustable, for adjusting a preload of a retention clip.

13. The cargo deck according to claim 7 wherein the retaining element comprises recesses to accommodate functional elements attached on the cargo deck in the inoperative position.

* * * * *